Jan. 17, 1939.   P. LEHOCZKY   2,144,114
X-RAY MACHINE
Filed March 10, 1937   2 Sheets—Sheet 1
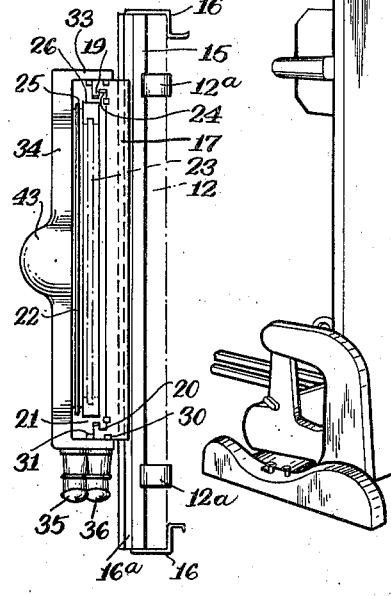
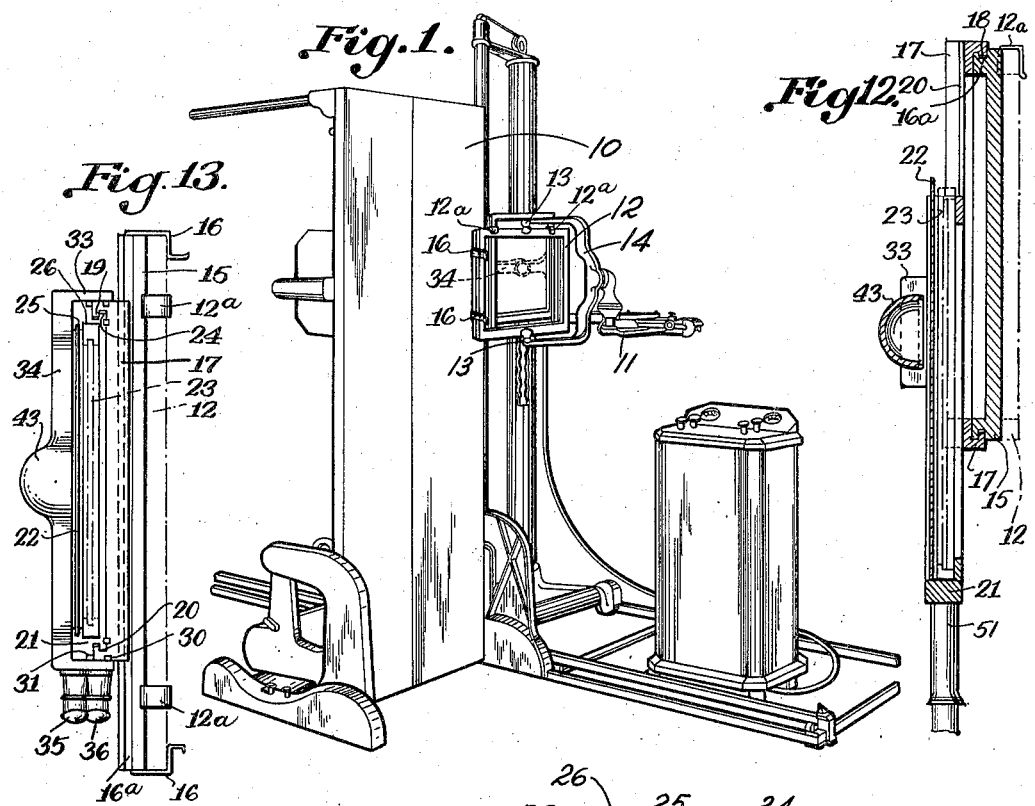
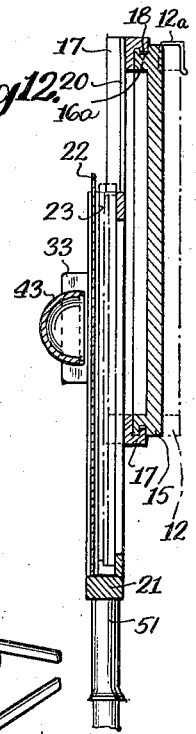
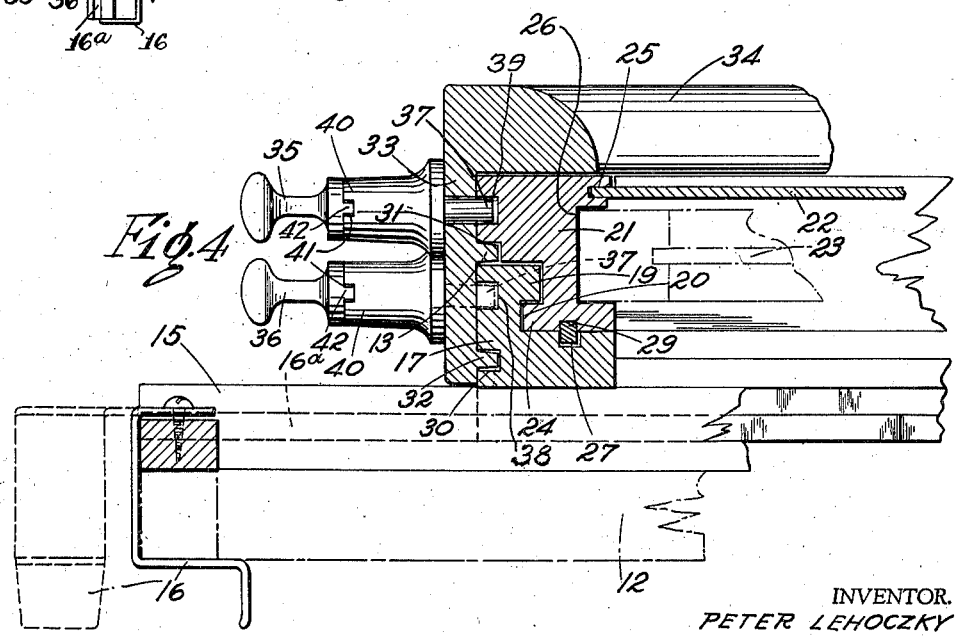
INVENTOR.
PETER LEHOCZKY
BY  Richey & Watts.
ATTORNEYS Jan. 17, 1939.  P. LEHOCZKY  2,144,114
X-RAY MACHINE
Filed March 10, 1937   2 Sheets-Sheet 2
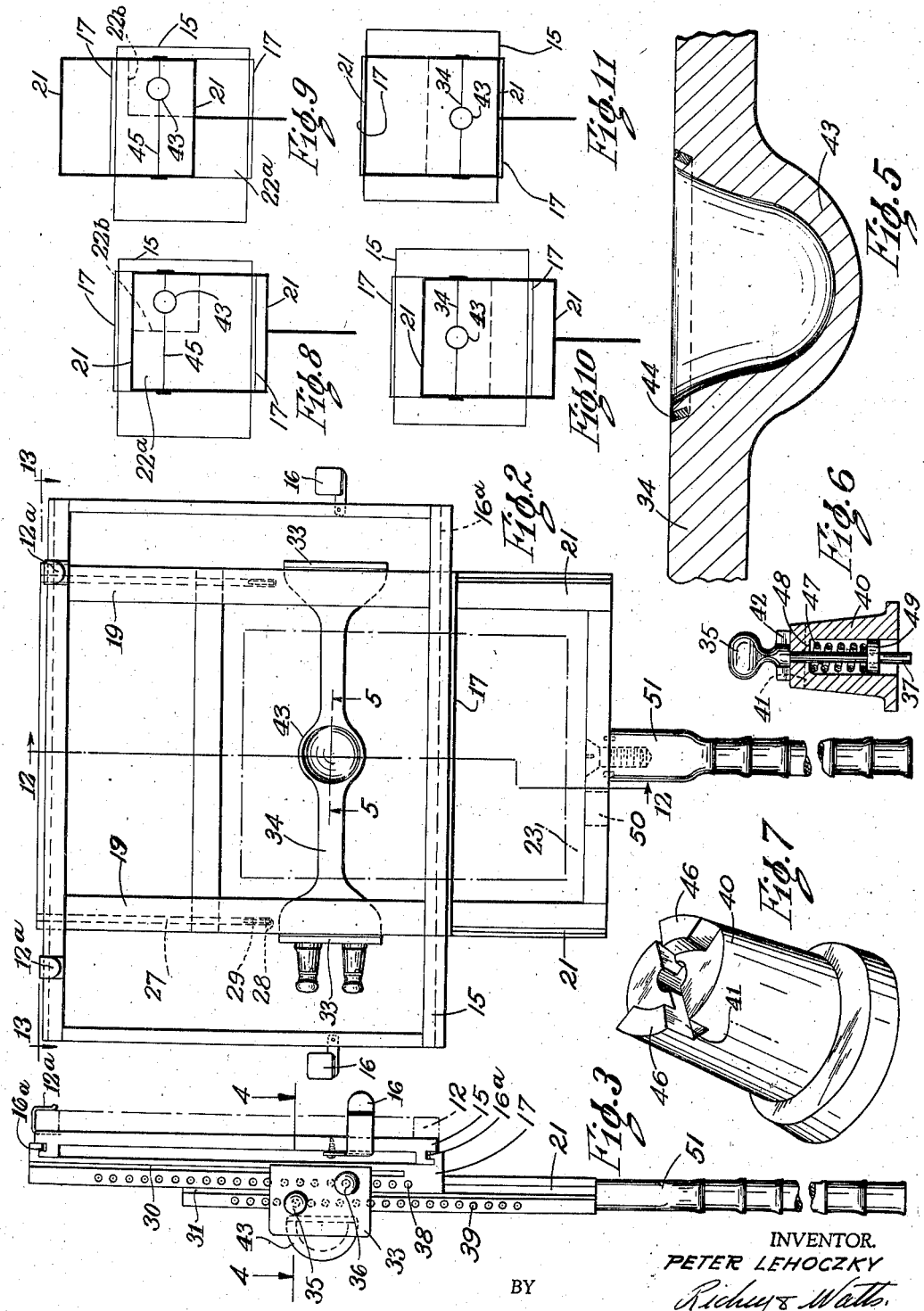
INVENTOR.
PETER LEHOCZKY
BY
ATTORNEYS Patented Jan. 17, 1939

2,144,114

UNITED STATES PATENT OFFICE 2,144,114

X-RAY MACHINE

Peter Lehoczky, Rocky River, Ohio, assignor of one-half to Herman J. Speck, Cleveland, Ohio Application March 10, 1937, Serial No. 130,080

5 Claims. (Cl. 250—58)

This invention relates broadly to X-ray machines and more specifically to improvements in fluoroscopic screen holders therefor.

The object of the invention is in the provision of a film holder which may be adjusted vertically and horizontally relative to the fluoroscopic screen holder so that the Roentgen rays may be confined to divisional areas of the film during radiographic examination.

The structure of the improved frame assembly comprises, generally, a rectangular frame adapted to support the film casing and also a lead mask or blocker. This frame is mounted for adjustment in a vertical plane upon a second frame, adjustable in a horizontal plane, and carried by an adapter mounted upon the arm of an X-ray machine which normally supports the fluoroscopic screen.

The invention further contemplates the provision of a device for indicating in the radiograph the location of a foreign body in a patient when the image of such foreign body is indefinite or indistinct. As embodied herein the image marking device or index is supported by and adjustable with the film frame member being designed for registration with the divisional areas thereof as effected by the various adjustments of the two frame members constituting the assembly.

Other objects of the invention comprehend a structure which is light in weight, durable of structure, economic of manufacture and susceptible of ready adjustment and ease of manipulation.

Referring to the drawings wherein the preferred embodiment of the invention is illustrated:

Fig. 1 is a view in perspective of a commercial form of X-ray machine including the film frame and adapter which embodies the present invention;

Fig. 2 is a plan view of the adapter and frame members;

Fig. 3 is a side elevational view of the apparatus illustrated in Fig. 2;

Fig. 4 is an enlarged detail view partially in section of the adapter, the frame members and the image marking or index device;

Fig. 5 is a longitudinal sectional view of the index device, the section being taken on a plane indicated by the line 5—5 in Fig. 2;

Fig. 6 is a vertical section through a locking device for retention of the frame members and index device, the section being taken on the plane indicated by the line 6—6 in Fig. 3;

Fig. 7 is a view in perspective of an alternate form of lock for securing the frame and index devices in their adjusted position;

Figs. 8, 9, 10 and 11 are diagrammatic views of the adapter, frame and index device and illustrating the arrangement of the various members in their adjusted position;

Fig. 12 is a vertical section through the improved screen holder, the section being taken on a plane indicated by the line 12—12 in Fig. 2; and Fig. 13 is a top plan view of the holder as seen from the plane indicated by the arrows 13—13 in Fig. 2.

Referring first to Fig. 1, the X-ray machine indicated generally by the reference character 10 is provided with an adjusted swinging arm 11 adapted to support the fluoroscopic screen 12, which is normally retained by trunnions 13 mounted in a yoked carrier 14 pivotally supported upon the arm 11.

In the present invention a rectagular adapter 15 is mounted upon the screen 12 by means of hooks 12a and resilient clamps 16 which as indicated in Fig. 4 are pivotally supported upon the adapter and constructed for rotative engagement with the lower face of the screen 12. The adapter 15, as indicated in Figs. 3 and 12 is provided with longitudinal grooves or guideways 16a in the upper and lower rails thereof to facilitate horizontal movement of a frame member 17 coordinated therewith. The frame member 17 is formed with tongues or flanges 18 (Fig. 12) engaged within the grooves 16a in the adapter 15 and is also formed with vertically disposed side rails 19 having grooves 20 in the inner faces thereof to facilitate the vertical movement of a frame 21. The frame member 21 is formed with tongues or ledges 24, see Fig. 4, engaged within the guideways 20 and with grooves 25 and 26 to support respectively the lead mask or blocker 22 and a film casing or holder 23. The frame 17 is formed with grooves 27 which terminate adjacent the central portion of the side rails of the frame 17 forming shoulders 28 which are adapted to engage keys 29 inlaid in the side rail members of the frame 21 to restrict the upward vertical movement thereof. The vertical side rails of the frame members 17 and 21 are formed with grooves 30 and 31 respectively for the reception of the tongues 32 formed in a flange 33 depending from a cross arm 34 which spans the frames 17 and 21. Upon one of the flanges 33 there is a pair of spring pressed plungers 35 and 36, the end portions or bolts 37 thereof being engageable respectively with the series of detents 38 and 39 in the rails 17 and 21. The plungers are mounted in posts 40 having notches 41 in the free ends thereof for the reception of tongues 42 in the lower face of the plungers. The height of the tongues is equal to or slightly greater than the effective length of the bolts 37 so that the plungers may be held in their retracted position when the tongues 42 are withdrawn from detents and rotated to engage the upper face of the post 40.

The cross arm 34 is formed of a material which is susceptible of penetration by the Roentgen ray. The central portion of the arm, as shown in Fig. 5, is formed with an enlarged cup section 43 which is provided to retain a ring 44 constructed of lead or a similar Roentgen ray resisting material capable of casting a shadow upon the film during radiographic exposure and for the purpose of marking the particular zone which the Roentgenologist may wish to refer to in his future study of the negative. As shown diagrammatically in Figs. 8 and 9 an arm 45 having the cup section 43 disposed intermediate the center of the arm and an outer edge thereof is provided for use where the Roentgenologist wishes to make radiographic studies which are confined to a quarter of the area of the fluoroscopic screen or film frame 21.

As described above the frame 17 may be horizontally adjusted upon the adapter 15 and the frame member 21 may be vertically adjusted upon the frame 17. Thus as illustrated diagrammatically in Fig. 10 the arm 34 may be adjusted to support the frame 21 in registration with the upper half of the frame 17, at which time a lead mask 22 of suitable size for blocking the Roentgen rays is positioned to cover the lower half of the frame 21. When it is desired to make a second exposure or radiograph the arm 34 is adjusted as in Fig. 11 to support the lower portion of the frame 21 upon the lower portion of the frame 17, the lead mask 22 in this case being disposed in the upper portion of the frame 21. In making either of the adjustments it will be noted vertical adjustment of the arm 34 may be slightly varied by virtue of the disposition of the detents 38 and 39 in the frames 17 and 18 and that the frames 17 and 21 may be laterally adjusted upon the adapter 15 so that the shadow cast upon the film by the ring 44 may circumscribe the foreign body in the patient or the area the Roentgenologist or physician may later wish to give some particular study.

As will be seen in Fig. 8 the cup 43 of the arm 45 is arranged for registration generally with the upper right hand quarter of the frame 21. While as shown in Fig. 9 the cup 43 is disposed over the lower right hand quarter of the frame 21, the disposition of the cup in this case being attained by lowering the arm and frame 21 and by manipulation of the plungers to lock the frames in adjusted position. When a radiographic exposure is made with the frames and arm adjusted as shown in Fig. 8, a lead screen 22a having a cut away portion 22b in the upper quadrant thereof, is employed. In making the exposure shown in Fig. 9 the screen 22a is removed from the frame 21 turned end for end and reinserted in its guideway 25. When it is desired to expose the upper and lower quadrants of the frame 21 the frames, arm and mask may be adjusted in the manner described in the foregoing in which event the film casing 23 is withdrawn from the groove 26, turned end for end and reinserted in the groove 26.

As shown in Fig. 7 the posts 40 for the spring pressed plunger are formed with bosses 46 adapted to abut the tongues 42 to arrest rotation of the plungers so that the operator may not inadvertently lock the frames by the reentrant engagement of the tongues within the slotted end portions of the posts. As shown in Fig. 6 the plungers 35 and 36 are urged into position for engagement with the detents by compression springs 47 confined between the shoulder 48 and a collar 49 affixed upon the shank of the plunger.

To facilitate the removal of the film holder or casing 23 an aperture 50 is provided in the lower rail of the frame member 17, this opening being disposed contiguous the arm 51 to accommodate ease of operation when the Roentgenologist is transferring the film casing and shifting the frames during radiographic examination.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In an X-ray machine embodying a fluoroscopic screen, a film supporting frame assembly comprising an adapter mounted on said screen, a frame horizontally slidable thereon and having detents in a side rail thereof, a second frame for supporting a film container and lead mask vertically slidable on said first named frame and having detents on a side rail thereof, an arm vertically adjustable on said second named frame, a lead ring on said arm intermediate its ends, flanges on said arm disposed to overlie the sides of the first and second named frames, spring pressed plungers on one of said flanges engageable respectively with said detents in said frames whereby said arm and said frames may be secured in vertically adjusted position relative to each other.

2. In an X-ray machine having a fluoroscopic screen mounted thereon, a film holder therefor comprising an adapter mounted on said screen, a frame horizontally slidable on said adapter, a second frame having guideways therein for the reception respectively of a film container and lead mask and mounted for vertical slidable adjustment thereon, a lead mask in one of said guideways, said mask having a quadrant as defined by its vertical and horizontal axis removed from a corner portion thereof, an arm spanning said second named frame, and locking means coordinated with said arm and said first and second named frames for securing said arm and frames in vertical adjusted position.

3. In an X-ray machine having a fluoroscopic screen mounted thereon, a film holder therefor comprising an adapter, spring clips pivotally mounted thereon for detachably securing said adapter to said screen, a rectangular frame horizontally slidable on said adapter, a second rectangular frame for supporting a film case and lead mask vertically slidable on said first named frame, an arm spanning said second named frame and vertically adjustable thereon, a hemispherical enlarged portion in said arm intermediate its ends, a lead ring inlaid in the edge of said enlarged portion for casting a shadow upon the film during radiographic exposure, and means on said arm coordinated with said frames for interlocking the arm and frames in vertical adjusted position.

4. In an X-ray machine embodying a fluoroscopic screen, a film supporting frame assembly comprising an adapter mounted on said screen, a frame horizontally slidable thereon, a second frame having grooves therein to support respectively a film casing and lead mask vertically slidable upon the first named frame, a lead mask mounted in said second named frame and having a corner quadrant as defined by its vertical and horizontal axis removed therefrom, an arm on said second named frame being mounted for vertical adjustment thereon, a lead ring in said arm intermediate an edge and the center thereof, and means on said arm coordinated with said frames for locking said frames in position whereby upon manipulation of said mask and said first named frame said ring may be disposed successively in each quadrant of the adapter.

5. In an X-ray machine embodying a fluoroscopic screen, a film supporting frame assembly comprising an adapter mounted on said screen, a frame horizontally slidable thereon, a second frame having grooves therein to support respectively a film casing and lead mask vertically slidable upon the first named frame, a lead mask mounted in said second named frame and having a portion thereof cut away, an arm on said second samed frame mounted for vertical adjustment thereon, a lead ring in said arm intermediate its ends, and means on said arm coordinated with said frames for locking the arms and frames respectively in adjusted positions wherein said ring is disposed superjacent the cut away portion of said mask.

PETER LEHOCZKY.